(12) United States Patent
Kabe et al.

(10) Patent No.: US 9,577,249 B2
(45) Date of Patent: Feb. 21, 2017

(54) CATHODE MATERIAL FOR LITHIUM SECONDARY BATTERY, AND METHOD OF PRODUCING SAID CATHODE MATERIAL

(75) Inventors: Isao Kabe, Yokohama (JP); Gaku Oriji, Kawasaki (JP); Akihisa Tonegawa, Yokohama (JP)

(73) Assignee: SHOWA DENKO K.K., Tokyo (JP)

( * ) Notice: Subject to any disclaimer, the term of this patent is extended or adjusted under 35 U.S.C. 154(b) by 565 days.

(21) Appl. No.: 14/113,510

(22) PCT Filed: Apr. 25, 2012

(86) PCT No.: PCT/JP2012/061034
§ 371 (c)(1),
(2), (4) Date: Oct. 23, 2013

(87) PCT Pub. No.: WO2012/147766
PCT Pub. Date: Nov. 1, 2012

(65) Prior Publication Data
US 2014/0087258 A1    Mar. 27, 2014

(30) Foreign Application Priority Data
Apr. 28, 2011 (JP) .................................. 2011-102389

(51) Int. Cl.
*H01M 4/36* (2006.01)
*C01B 25/37* (2006.01)
(Continued)

(52) U.S. Cl.
CPC .............. *H01M 4/366* (2013.01); *C01B 25/37* (2013.01); *C01B 25/45* (2013.01); *H01M 4/587* (2013.01);
(Continued)

(58) Field of Classification Search
CPC ........ C01B 25/37; C01B 25/45; H01M 4/366; H01M 4/5825; H01M 4/625; H01M 4/587; H01M 10/0525
See application file for complete search history.

(56) References Cited

U.S. PATENT DOCUMENTS

| 6,855,273 B2 | 2/2005 | Ravet et al. |
| 2004/0033360 A1 | 2/2004 | Armand et al. |
| | (Continued) | |

FOREIGN PATENT DOCUMENTS

| CN | 1889290 A | 1/2007 |
| CN | 101442126 A | 5/2009 |
| | (Continued) | |

OTHER PUBLICATIONS

Hosono et al., "Synthesis of Triaxial LiFePO4 Nanowire with a VGCF Core Column and Carbon Shell through the Electrospinning Method", Applied Materials & Interfaces, vol. 2, No. 1, p. 212-218 (2010).

(Continued)

*Primary Examiner* — Emily Le
*Assistant Examiner* — Monique Wills
(74) *Attorney, Agent, or Firm* — Sughrue Mion, PLLC

(57) ABSTRACT

A cathode material for a lithium secondary battery, including fibrous carbon and a plurality of cathode active material particles bonded to a surface of the fibrous carbon. The cathode active material particles are composed of olivine-type $LiMPO_4$ where M represents one or more kinds of elements selected from Fe, Mn, Ni, and Co. Also disclosed is a method of producing the cathode material and a lithium secondary battery.

14 Claims, 2 Drawing Sheets

(51) Int. Cl.
*C01B 25/45* (2006.01)
*H01M 4/58* (2010.01)
*H01M 4/62* (2006.01)
*H01M 4/587* (2010.01)
*H01M 10/0525* (2010.01)

(52) U.S. Cl.
CPC ........... *H01M 4/5825* (2013.01); *H01M 4/625* (2013.01); *H01M 10/0525* (2013.01); *H01M 2220/20* (2013.01)

(56) References Cited

U.S. PATENT DOCUMENTS

| | | | | |
|---|---|---|---|---|
| 2007/0172734 A1* | 7/2007 | Noguchi | ............... | H01M 4/485 429/223 |
| 2009/0117022 A1 | 5/2009 | Nuspl et al. | | |
| 2009/0305132 A1 | 12/2009 | Gauthier et al. | | |
| 2012/0214040 A1* | 8/2012 | Tsutsumi | ............... | H01G 11/26 429/99 |
| 2012/0214070 A1* | 8/2012 | Yamamoto | ............ | H01M 4/485 429/231.8 |
| 2014/0242445 A1* | 8/2014 | Gozdz | ............... | H01M 10/0569 429/158 |

FOREIGN PATENT DOCUMENTS

| | | |
|---|---|---|
| JP | 2005-123107 A | 5/2005 |
| JP | 2007-35488 A | 2/2007 |
| JP | 2008-47412 A | 2/2008 |
| JP | 2008-130526 A | 6/2008 |
| JP | 2008-532910 A | 8/2008 |
| JP | 2008-270204 A | 11/2008 |
| JP | 2008-542979 A | 11/2008 |
| JP | 4176804 B2 | 11/2008 |
| JP | 4192574 B2 | 12/2008 |
| JP | 2009-43514 A | 2/2009 |
| JP | 2009-81072 A | 4/2009 |
| JP | 2009-272041 A | 11/2009 |
| WO | 2008/105490 A1 | 9/2008 |
| WO | 2010/012076 A1 | 2/2010 |

OTHER PUBLICATIONS

Communication dated Sep. 18, 2015 from the Patent Office of the P.R. of China issued in corresponding Chinese application No. 201280020089.7.
Office Action with a mailing date of Feb. 6, 2014 for corresponding Taiwanese Patent Application No. 101114699.
Communication dated Apr. 3, 2015 from the State Intellectual Property Office of the People's Republic of China in counterpart application No. 201280020089.7.
International Search Report for PCT/JP2012/061034 dated Jul. 3, 2012.

* cited by examiner

CATHODE MATERIAL FOR LITHIUM SECONDARY BATTERY, AND METHOD OF PRODUCING SAID CATHODE MATERIAL

CROSS REFERENCE TO RELATED APPLICATIONS

This application is a National Stage of International Application No. PCT/JP2012/061034, filed on Apr. 25, 2012, which claims priority from Japanese Patent Application No. 2011-102389, filed on Apr. 28, 2011, the contents of all of which are incorporated herein by reference in their entirety.

TECHNICAL FIELD

The present invention relates to a cathode material for a lithium secondary battery, and a method of producing the same.

BACKGROUND ART

LiFePO$_4$, which is a kind of olivine-type lithium metal phosphate, is not expensive compared to LiCoO$_2$ which has been widely used as a cathode active material for lithium secondary batteries in the related art. Accordingly, LiFePO$_4$ has been expected as a cathode active material of a lithium secondary battery in the future, particularly, a large-scaled lithium secondary battery for vehicles.

As a method of producing LiFePO$_4$, a solid phase synthesis method, a hydrothermal synthesis method, and a sol-gel method are known, but among these, the hydrothermal method capable of obtaining LiFePO$_4$ having a small particle size at a relatively low temperature and in a short time is regarded as the best method. However, LiFePO$_4$ has electronic conductivity lower than that of LiCoO$_2$ of the related art, and thus complexation with a conductive additive has been reviewed.

Patent Document 1 (Japanese Unexamined Patent Application, First Publication No. 2008-270204) discloses a cathode material in which micro carbon fibers are attached to a particle surface of a cathode active material in a netlike shape.

In addition, Patent Document 2 (Japanese Unexamined Patent Application, First Publication No. 2005-123107) discloses an active material for electrochemical elements. The active material has a structure in which a part or the entirety of a carbon material is coated with olivine-type lithium phosphate.

In addition, Patent Document 3 (Japanese Unexamined Patent Application, First Publication No. 2008-130526) discloses an active material for electrochemical elements. The active material includes primary particles of a lithium-containing iron phosphate compound having an olivine-type structure, and secondary particles having a carbon material. The secondary particles have an approximately spindle shape, or an approximately rhombic shape or elliptical shape in a plan view.

In addition, Patent Document 4 (Japanese Unexamined Patent Application, First Publication No. 2009-43514) discloses a cathode material which includes active material particles composed of an olivine acid salt, a first conductive material attached to a surface of the active material particles, and a second conductive material which is composed of a fibrous carbon material and is coupled with the first conductive material. In the cathode material, each second conductive material is coupled with a plurality of active materials through the first conductive material 158.

In addition, Patent Document 5 (Japanese Unexamined Patent Application, First Publication No. 2008-542979) discloses a cathode material in which a carbon layer coupled to at least a part of a surface of composite oxide particles or a particle assembly by a chemical coupling and/or physical coupling is formed.

In addition, Patent Document 6 (Japanese Unexamined Patent Application, First Publication No. 2009-272041) discloses a cathode material in which fine carbon fibers are attached to a particle surface of a cathode active material in a netlike shape.

In addition, Patent Document 7 (Japanese Unexamined Patent Application, First Publication No. 2007-35488) discloses a cathode material. The cathode material includes a plurality of cathode active material layers, each containing a cathode active material with a different component. A cathode active material having the highest resistance increase rate during overcharge is contained as a main component in at least one layer excluding the outermost surface layer of the positive electrode among the cathode active material layers, and a fibrous carbon material is used as a conductive additive of the layer in which the cathode active material having the highest resistance increase rate is contained as a main component.

In addition, Patent Document 8 (Japanese Patent No. 4192574) discloses an electrode for a nonaqueous electrolyte secondary battery. In the electrode, an electrode mix, which contains an electrode active material composed of a mixed active material of a lithium and manganese composite oxide expressed by a general formula Li$_x$Mn$_{2-y}$M$_y$O$_4$ and a lithium composite oxide expressed by a general formula Li$_x$M'O$_2$, a conductive material, a fibrous carbon, and a binding agent, is coated on a current collector, and the fibrous carbon is contained in a ratio of 0.2% to 5.0% on the basis of the total amount of the electrode mix.

In addition, Patent Document 9 (U.S. Pat. No. 4,176,804) discloses a production method in which synthesis of LiMPO$_4$ is carried out in the presence of a carbon-containing or electronic conductive material, or a precursor of the electronic conductive material.

CITATION LIST

Patent Literature

[Patent Document 1] Japanese Unexamined Patent Application, First Publication No. 2008-270204
[Patent Document 2] Japanese Unexamined Patent Application, First Publication No. 2005-123107
[Patent Document 3] Japanese Unexamined Patent Application, First Publication No. 2008-130526
[Patent Document 4] Japanese Unexamined Patent Application, First Publication No. 2009-43514
[Patent Document 5] Japanese Unexamined Patent Application, First Publication No. 2008-542979
[Patent Document 6] Japanese Unexamined Patent Application, First Publication No. 2009-272041
[Patent Document 7] Japanese Unexamined Patent Application, First Publication No. 2007-35488
[Patent Document 8] Japanese Patent No. 4192574
[Patent Document 9] Japanese Patent No. 4176804

DISCLOSURE OF INVENTION

However, in the cathode material disclosed in Patent Document 1 to Patent Document 10, the active material particles are repetitively expanded and contracted due to charging and discharging, and as a result, the active material particles and the conductive material may be separated from each other in some cases. Therefore, there is a problem in that electronic conductivity of the cathode active material gradually decreases along with progress of a charging and discharging cycle of a battery.

In addition, in the cathode material described in Patent Document 4, the thermal expansion coefficient of the active material particles composed of the olivine acid salt, the thermal expansion coefficient of the first conductive material, and the thermal expansion coefficient of the second conductive material are different from each other. Therefore, when an external temperature of the battery varies, the first conductive material is peeled from the active material particles in some cases, or the first conductive material and the second conductive material are separated from each other in some cases due to the difference in the thermal expansion coefficient between the active material particles, the first conductive material, and the second conductive material.

As described above, in the electrode material of the related art, the cathode material gradually deteriorates during use of the battery in some cases.

[1] According to an aspect of the invention, there is provided a cathode material for a lithium secondary battery, in which a plurality of cathode active material particles composed of olivine-type $LiMPO_4$ (provided that, M represents one or more kinds of elements selected from Fe, Mn, Ni, and Co) are bonded to a surface of fibrous carbon.

[2] In the cathode material for a lithium secondary battery according to [1], a surface except a bonding surface with the fibrous carbon in a surface of the cathode active material particles, is coated with carbon.

[3] In the cathode material for a lithium secondary battery according to [1] or [2], one or more kinds of metals selected from Co, Ti, V, Cr, Mn, W, Mo, Fe, Cu, Al, V, Nb, and Ta, or one or more kinds of oxides of the metals may be carried on the surface of the fibrous carbon, and the cathode active material particles may be bonded to the surface at a position at which the metals or metal oxides are carried.

[4] In the cathode material for a lithium secondary battery according to any one of [1] to [3], the amount of the fibrous carbon is in a range of 0.5% by mass to 10% by mass in the cathode material.

[5] In the cathode material for a lithium secondary battery according to any one of [1] to [4], an average fiber length of the fibrous carbon may be in a range of 1 µm to 100 µm.

[6] In the cathode material for a lithium secondary battery according to [5], an aspect ratio (fiber length/fiber diameter) which is a ratio of a fiber length to a fiber diameter of the fibrous carbon may be in a range of 5 to 1000.

[7] In the cathode material for a lithium secondary battery according to any one of [1] to [6], an average particle size of the cathode active material particles may be in a range of 20 nm to 200 nm.

[8] In the cathode material for a lithium secondary battery according to any one of [1] to [7], one or two kinds of elements selected from Nb and V may be contained in $LiMPO_4$.

[9] In the cathode material for a lithium secondary battery according to any one of [1] to [8], the cathode active material particles may be directly bonded to the surface of the fibrous carbon, and the cathode active material particles are not bonded by a carbon layer which is not a structure of the fibrous carbon, and in a case where one or more kinds of metals selected from Co, Ti, V, Cr, Mn, W, Mo, Fe, Cu, Al, V, Nb, and Ta, or one or more kinds of oxides of the metals are carried on the surface of the fibrous carbon, the bonding surface may optionally contain the metals or the metal oxides.

[10] According to another aspect of the invention, there is provided a method of producing a cathode material for a lithium secondary battery. The method includes: carrying out a conversion reaction into olivine-type $LiMPO_4$ at 100° C. or higher by using a Li source, an M source, and a phosphoric acid source as a raw material under the presence of a polar solvent in which fibrous carbon is mixed to allow a plurality of cathode active material particles composed of the $LiMPO_4$ to grow on a surface of the fibrous carbon.

[11] In the method of producing a cathode material for a lithium secondary battery according to [10], the method may further include: preparing a first raw material liquid containing any one kind of source selected from the lithium source, the M source, and the phosphoric acid source, and the polar solvent, and a second raw material liquid containing the remainder which is not contained in the first raw material liquid among the lithium source, the M source, and the phosphoric acid source, and the polar solvent; adding the fibrous carbon to one or both of the first raw material liquid and the second raw material liquid in advance, or adding the fibrous carbon when the first raw material liquid and the second raw material liquid are mixed; and mixing the first raw material liquid and the second raw material liquid to allow the conversion reaction to occur.

[12] In the method of producing a cathode material for a lithium secondary battery according to [11] or [12], the conversion reaction may be carried out under conditions of retention at a temperature of 100° C. to 160° C. and a pressure of 0.1 MPa to 0.6 MPa for 30 minutes to 30 hours, and then retention at a temperature of 180° C. to 260° C. and a pressure of 1.0 MPa to 4.7 MPa for 30 minutes to 30 hours.

[13] In the method of producing a cathode material for a lithium secondary battery according to any one of [10] to [12], as the fibrous carbon, fibrous carbon in which one or more kinds of metals selected from Co, Ti, V, Cr, Mn, W, Mo, Fe, Cu, Al, V, Nb, and Ta, or one or more kinds of oxides of the metals are carried on the surface may be used.

[14] In the method of producing a cathode material for a lithium secondary battery according to any one of [10] to [13], a material containing Nb or V may be added to the raw material.

[15] In the method of producing a cathode material for a lithium secondary battery according to any one of [10] to [13], the lithium source may be lithium hydroxide, the M source may be a sulfate of one or more kinds of metals selected from Fe, Mn, Ni, and Co, and the phosphoric acid source may be phosphoric acid.

[16] In the method of producing a cathode material for a lithium secondary battery according to any one of [10] to [13], lithium phosphate may be used as the lithium source and the phosphoric acid source.

According to the invention, it is possible to provide a cathode material for a lithium secondary battery, which is capable of suppressing occurrence of a structural deterioration even when the active material particles are repetitively expanded and contracted due to charging and discharging, or even when a temperature variation occurs in an external environment of a battery, and a method of producing the cathode material.

DETAIL DESCRIPTION OF THE INVENTION

Figure 1:
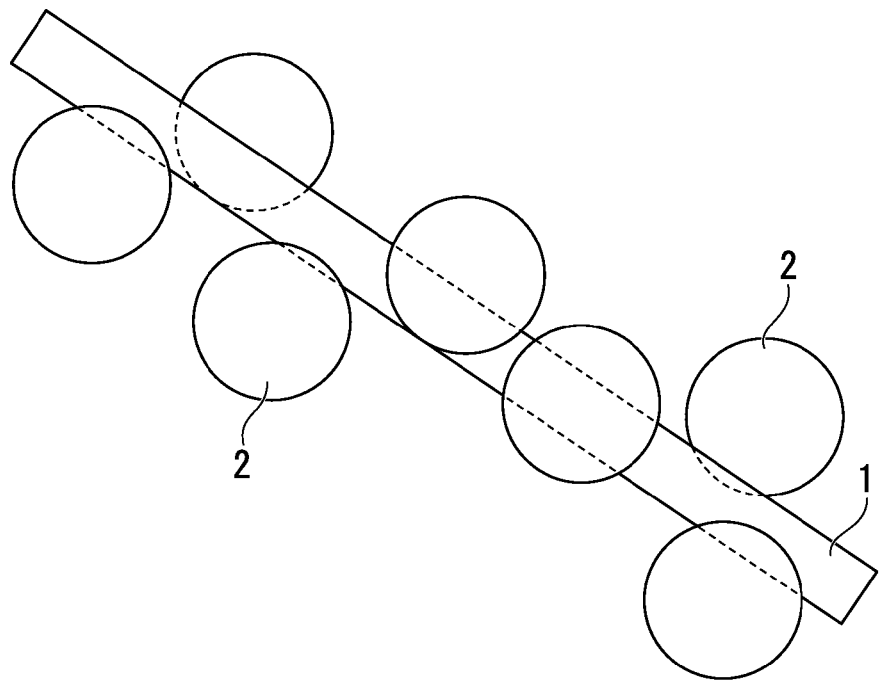
FIG. 1 is a schematic diagram illustrating an example of a cathode material as an embodiment of the invention.

As an embodiment of the invention, a method of producing a cathode material for a lithium secondary battery, a cathode material for a lithium secondary battery, and a lithium secondary battery will be described.

(Method of Producing Cathode Active Material for Lithium Secondary Battery)

The cathode active material for a lithium secondary battery of a preferred aspect of the embodiment is produced by initiating and progressing a conversion reaction into olivine-type $LiMPO_4$ at 100° C. or higher by using a Li source, an M source, and a phosphoric acid source as raw materials under the presence of a polar solvent in which fibrous carbon is mixed to allow a plurality of cathode active material particles composed of the $LiMPO_4$ to grow on a surface of the fibrous carbon. In addition, after the growth of the cathode active material particles, the surface of the cathode active particles may be coated with carbon. Hereinafter, the production method will be sequentially described. In this specification, a material in which a plurality of cathode active material particles composed of the $LiMPO_4$ are bonded to a surface of fibrous carbon is referred to as a cathode material.

(Fibrous Carbon)

As fibrous carbon which is used in the production method of a preferred aspect of the embodiment, a so-called carbon fiber or carbon nanotube may be used. As the carbon fiber, a carbon fiber produced by a vapor phase synthesis method is an exemplary example.

In addition, the carbon fiber is not particularly limited as long as the carbon fiber has satisfactory conductivity, but a vapor phase method carbon fiber (including a carbon nanotube), in which crystallinity is high and a graphene sheet is laminated in a direction perpendicular to a fiber axis, is preferable.

In addition, as a preferable type of the vapor phase method carbon fiber, a branched fiber is an exemplary example. A branched portion has a hollow structure in which the entirety of the fiber including the branched portion is in a communicating state, and a carbon layer constituting a cylindrical portion of the fiber is continuously formed. The hollow structure is a structure in which the carbon layer is wound in a cylindrical shape, and includes a structure not having a perfect cylindrical shape, a structure having a partially cut-out portion, a structure in which two laminated carbon layers are coupled to one layer, and the like. In addition, a cross-section of the cylindrical portion is not limited to a perfect circle, and includes an elliptical cross-section or a polygonal cross-section.

The vapor phase method carbon fiber has unevenness or fluctuation on a fiber surface in many cases, and thus there is an advantage in that adhesiveness with a cathode active material is improved. When the adhesiveness is improved, the cathode active material and the vapor phase method carbon fiber are not detached from each other, and thus a satisfactory adhesion state may be maintained. Accordingly, a cycle life may be improved while maintaining conductivity of an electrode.

In a case where the vapor phase method carbon fiber includes a lot of branched fibers, a network may be more efficiently formed in an electrode. In addition, the network may be satisfactorily maintained between the cathode active material particles, and thus flexibility of the entirety of the electrode may be enhanced.

An average fiber length of the fibrous carbon is preferably in a range of 1 μm to 100 μm, more preferably in a range of 2 μm to 50 μm, and still more preferably in a range of 3 μm to 20 μm. In addition, an aspect ratio (fiber length/fiber diameter) which is a ratio of a fiber length to a fiber diameter of the fibrous carbon is preferably in a range of 5 to 1000, more preferably in a range of 10 to 500, and still more preferably 50 to 300. When the average fiber length is 1 μm or more, or the aspect ratio is 5 or more, when forming a cathode using a cathode material, the fibrous carbon is sufficiently intertwinded, and thus an electronic conductive network may be formed. In addition, when the average fiber length is 100 μm or less, or the aspect ratio is 1000 or less, a cathode mix having a uniform composition may be adjusted without significant agglomeration of the fibrous carbon during production of the cathode. In addition, the average fiber diameter of the fibrous carbon is preferably in a range of 5 nm to 300 nm, and more preferably 10 nm to 200 nm. When the fiber diameter within these ranges is employed, contribution to the conductive network between the cathode active material particles is raised and thus these ranges are preferable.

In addition, as the fibrous carbon, fibrous carbon in which one or more kinds of metals selected from Co, Ti, V, Cr, Mn, W, Mo, Fe, Cu, Al, V, Nb, and Ta, or one or more kinds of oxides of the metals are carried on the surface is preferably used. When the metals or metal oxides are carried, when allowing a plurality of cathode active material particles composed of $LiMPO_4$ to grow, the growth reaction may be allowed to progress using the metals or metal oxides as a growth origin, and thus the adhesiveness between the fibrous carbon and the cathode active material particles may be further raised.

In a case where the fibrous carbon is composed of the carbon fiber, and the carbon fiber is produced by a vapor phase synthesis method, for example, the carbon fiber may be obtained by thermally decomposing an organic compound using a transition metal compound as a catalyst. A crystal growth direction of the vapor phase method carbon fiber is approximately parallel to the fiber axis, and the central portion of the fiber has a hollow structure in many cases.

Examples of the organic compound that is a raw material of the carbon fiber include toluene, benzene, naphthalene, ethylene, acetylene, ethane, natural gas, a gas such as carbon monoxide, and a mixture thereof. Among these, aromatic hydrocarbon such as toluene and benzene is preferable. The transition metal compound is an organic compound containing transition metals serving as a catalyst, specifically, metals of group IV to group X in a periodic table, and more specifically, Co, Ti, V, Cr, Mn, W, Mo, Fe, Cu, Al, V, Nb, and Ta. More preferably, the transition metal compound is an organic compound containing Fe. The metals contained in the transition metal compound become metals or metal oxides that are carried on the surface of the fibrous carbon.

The carbon fiber may be used after being pulverized. With regard to a pulverization method, a rotary pulverizer, a high-speed rotary mill, a ball mill, a medium agitation mill, a jet pulverizer, and the like may be used. Preferably, a vibration ball mill such as a circular vibration mill, a vibration mill, and a centrifugal mill according to a method of pressing and pulverizing a fiber using an impact force may be used. As a pulverization medium, a ceramic ball made of alumina, zirconia, or silicon nitride, or a metal ball made of stainless steel may be used. The stainless steel ball which may be removed by a high-temperature heat treatment is preferable.

Pulverization is preferably carried out under an atmosphere in which an oxygen concentration is 5% by volume or more. When 5% by volume or more of oxygen is present, a surface of a pulverized carbon fiber is modified, and thus the plurality of cathode active material particles composed of $LiMPO_4$ are easy to grow. Preferably, the pulverization may be carried out in the air.

In addition, a graphitization treatment may be carried out to improve the conductivity of the carbon fiber. The graphitization treatment may be carried out by carrying out a heat treatment under an inert gas atmosphere at a temperature of 2000° C. to 3000° C. In the case of carrying out pulverization, the graphitization treatment may be carried out as a previous process of the pulverization.

It is effective to carry out the graphitization treatment by mixing boron, which is a graphitization promoter, before the graphitization so as to increase the crystallinity. A boron source is not particularly limited, but for example, a powder of boron oxide, boron carbide, boron nitride, or the like may be mixed to the vapor phase method carbon fiber before graphitization to easily increase the crystallinity. At this time, it is preferable that boron remaining in the vapor phase method carbon fiber set to 0.1 ppm to 4,000 ppm. When the remaining boron is 0.1 ppm or more, an effect of improving the crystallinity is easily obtained. In addition, when the remaining boron is 4,000 ppm or less, boron present as a compound having low conductivity without contributing to promotion of the crystallization may be reduced, and thus conductivity of the vapor phase method carbon fiber may be improved.

(Polar Solvent)

Next, examples of the polar solvent include water, methanol, ethanol, 2-propanol, ethylene glycol, propylene glycol, acetone, cyclohexanone, 2-methylpyrrolidone, ethyl methyl ketone, 2-ethoxyethanol, propylene carbonate, ethylene carbonate, dimethyl carbonate, dimethyl formamide, dimethyl sulfoxide. Among these, water is preferable. These may be used alone or in combination of two or more kinds thereof.

(Li Source)

As the Li source, a compound which is easily dissolved in the polar solvent is preferable. Examples of the Li source include lithium hydroxide, lithium chloride, lithium fluoride, lithium bromide, lithium iodide, lithium oxide, lithium hydrogen sulfate, dihydrogen phosphate lithium, lithium phosphate, lithium carbonate, lithium hydrogen carbonate, and the like. Among these, lithium hydroxide is preferable.

(M Source)

As the M source, a compound including a divalent transition metal is preferable. As the divalent transition metal, one or more kinds of elements selected from Fe, Mn, Ni, and Co is an exemplary example. Among these, Fe and/or Mn are preferable. Examples of the M source include divalent transition metal sulfates, divalent transition metal chlorides, divalent transition metal fluorides, divalent transition metal bromides, divalent transition metal iodides, divalent transition metal nitrates, divalent transition metal phosphates, divalent transition metal oxalates, divalent transition metal acetates, and the like. As the M source, compounds that are easily dissolved in the polar solvent are preferable. Among these, the divalent transition metal sulfates are preferable, and iron (II) sulfate and/or manganese (II) sulfate, and hydroxide thereof are more preferable.

In addition, in addition to the above-described M source, a material containing Nb or V may be added to produce $LiMPO_4$ containing Nb or V. Examples of the material containing Nb include niobium phenoxide ($Nb(OC_6H_5)_5$, and niobium chloride $NbCl_5$, and examples of the material containing V include ammonium vanadate ($NH_4VO_3$).

(Phosphoric Acid Source)

The phosphoric acid source may be any material as long as phosphoric acid ions are contained, and a compound that is easily dissolved in the polar solvent is preferable. Examples of the phosphoric acid include phosphoric acid (orthophosphoric acid), metaphosphoric acid, pyrophosphoric acid, triphosphoric acid, tetraphosphoric acid, hydrogen phosphate, dihydrogen phosphate, ammonium phosphate, anhydrous ammonium phosphate, ammonium dihydrogen phosphate, diammonium hydrogen phosphate, lithium phosphate, iron phosphate, and the like. In addition, the lithium phosphate or the divalent transition metal phosphate may be used as the Li source or the M source.

In the production method according to a preferred aspect of the embodiment, the Li source, the M source, and the phosphoric acid source are allowed to react with each other at 100° C. or higher under presence of the polar solvent to which the fibrous carbon is mixed. Here, when the Li source, the M source, and the phosphoric acid source are mixed simultaneously, an unexpected side reaction may occur, and thus it is necessary to control the progress of the reaction.

Accordingly, in the present production method, the conversion reaction may be initiated after separately preparing a first raw material liquid in which any one kind of the lithium source, the phosphoric acid source, and the M source is contained in the polar solvent, and a second raw material liquid in which the other sources are contained in the polar solvent, mixing the first and second raw material liquids with each other, and setting a temperature and a pressure according to a predetermined condition. In addition, the fibrous carbon may be added to any one or both of the first raw material liquid and the second raw material. In addition, the first and second raw material liquids may be prepared without adding the fibrous carbon, and the fibrous carbon may be added when the first and second raw material liquids are mixed.

As a specific preparation example of the first and second raw material liquids, an aspect in which a liquid containing the Li source is prepared as the first raw material liquid, and a liquid containing the M source and the phosphoric acid source is prepared as the second raw material liquid; an aspect in which a liquid containing the phosphoric acid source is prepared as the first raw material liquid, and a liquid containing the M source and the Li source is prepared as the second raw material liquid; and an aspect in which a liquid containing the M source is prepared as the first raw material liquid, and a liquid containing the phosphoric acid and the Li source is prepared as the second raw material liquid. In addition, the first and second raw material liquids are kept not to come into contact with each other, specifically, the first and second raw material liquids are kept not to be mixed with each other. In this manner, the conversion reaction is substantially controlled to not occur at a temperature lower than 100° C.

In a preferred aspect of the embodiment, particularly, as a preferable mixing sequence of forming the cathode active material particles on the carbon fiber, preferably, the first raw material liquid containing the Li source and the phosphoric acid source, and the second raw material liquid containing the M source are prepared, and these first and second raw material liquids are mixed with each other to initiate the reaction. The fibrous carbon may be added in any stage, but from the viewpoint of dispersing the fibrous carbon in a liquid, the fibrous carbon may be added to a liquid in which pH is high (for example, a liquid containing lithium hydroxide).

When preparing the respective Li source, M source, and phosphoric acid source, it is preferable that Li ions, M metal ions, and phosphoric acid ions be set in substantially the same ratio as the stoichiometric ratio of $LiMPO_4$.

In addition, according to the production method, $LiMPO_4$ having one kind of metal M may be produced by using a compound containing any one kind of element selected from Fe, Mn, Ni, and Co as the M source. In addition, $LiMPO_4$ having two or more kinds of metals M may be produced by using a compound containing two or more kinds of elements selected from Fe, Mn, Ni, and Co as the M source.

Next, the first and second raw material liquids are brought into contact with each other under the presence of the fibrous carbon to allow the conversion reaction into $LiMPO_4$ to be initiated and to progress at 100° C. or higher. The conversion reaction is carried out by two stages including a stage of allowing crystal nuclei to sufficiently precipitate and grow, and a stage of reducing the defects of crystals.

In this manner, a composite of the carbon fiber and the $LiMPO_4$ may be synthesized by forming crystal nuclei of $LiMPO_4$ on the surface of the carbon fiber. When the crystal nuclei are formed in the reaction liquid, the composite may not be synthesized, and thus it is preferable to adjust synthesis conditions in order for the crystal nuclei to be formed preferentially on the surface of the carbon fiber than in the liquid. A temperature at which the crystal nuclei are formed on the surface of the carbon fiber is lower than a temperature at which the crystal nuclei are formed in the liquid. Accordingly, first, the crystal nuclei of $LiMPO_4$ may be formed on the surface of the carbon fiber at a low temperature, and crystals may be allowed to grow, and then the defect of the crystals may be reduced by increasing the temperature.

Specifically, first, the first and second raw material liquids are mixed, and the resultant mixture is retained at a temperature of 100° C. to 160° C. and a pressure of 0.1 MPa to 0.6 MPa for 30 minutes to 30 hours to form the crystal nuclei of $LiMPO_4$ on the surface of the carbon fiber, and then crystals are allowed to continuously grow. At this time, when the temperature is 100° C. or higher, the crystal nuclei of $LiMPO_4$ are easily formed, and when the temperature is 160° C. or lower, a crystal nucleus formation ratio on the surface of the carbon fiber increases. In addition, when the reaction time is 30 minutes or more, the number of crystal nuclei that are formed becomes sufficient, and when the reaction time is 30 hours or less, production efficiency does not decrease. In addition, when the pressure is in a range of 0.1 MPa to 0.6 MPa, the reaction may be allowed to progress smoothly.

The reaction is carried out in a pressure-resistant reactor such as an autoclave. When the first and second raw material liquids are brought into contact with each other, the first and second raw material liquids may be heated in advance to approximately 60° C. to 100° C., or may not be heated in advance. After the first and second raw material liquids are mixed in the pressure-resistant reactor, and then a container is hermetically closed, and then the resultant mixture is heated immediately (for example, within 1 to 2 hours) by the autoclave to 100° C. to 160° C., and a pressure is set to 0.1 MPa to 0.6 MPa, and then retention is carried out for 30 minutes to 30 hours. In addition, the atmosphere inside the reactor is preferably substituted with an inert gas or reducing gas. Examples of the inert gas include nitrogen, argon, and the like.

Next, the temperature is set to 180° C. to 260° C., and the pressure is set to 1.0 MPa to 4.7 MPa, and then retention is carried out for 30 minutes to 30 hours. When the temperature is 180° C. or higher, the quality of the crystal is improved, and when the temperature is 260° C. or lower, energy necessary for heating does not increase more than necessary, and thus the energy is not wastefully used. In addition, when the time is 30 minutes or more, the defect of crystals is sufficiently recovered, and when the time is 30 hours or less, production efficiency does not decrease. In addition, when the pressure is in a range of 1.0 MPa to 4.7 MPa, the reaction may be allowed to progress smoothly.

A plurality of particles composed of $LiMPO_4$ grow on the surface of the fibrous carbon due to the conversion reaction. In the case of using fibrous carbon in which metals or metal oxides are carried on the surface thereof, the particles composed of $LiMPO_4$ grow using the metals or metal oxides on the surface as a growth origin. In this manner, a suspension containing the cathode material according to the embodiment may be obtained.

The plurality of particles composed of $LiMPO_4$ grow on the surface of the fibrous carbon, and thus the cathode active material particles are directly bonded to the surface of the fibrous carbon, and the cathode active material particles are not bonded by a carbon layer which is not a structure of the fibrous carbon. However, in a case where one or more kinds of metals selected from Co, Ti, V, Cr, Mn, W, Mo, Fe, Cu, Al, V, Nb, and Ta, or one or more kinds of oxides of the metals are carried on the surface of the fibrous carbon, the bonding surface may optionally contain the metals or the metal oxides.

The suspension that is obtained is cooled to room temperature to separate a liquid and a solid from each other. Unreacted lithium ions and the like may be contained in the separated liquid, and thus the Li source and the like may be recovered from the separated liquid. A recovery method is not particularly limited. For example, a basic phosphoric acid source is added to the separated liquid to precipitate lithium phosphate. In addition, the precipitate is recovered, and may be used again as the Li source or the phosphoric acid source.

The cathode material separated from the suspension is cleaned and dried as necessary. With regard to the drying, it is preferable to select conditions under which the metal M is not oxidized. With regard to the drying, a vacuum drying method is preferably used.

In addition, to further apply conductivity to $LiMPO_4$ in the cathode material, the cathode material that is obtained, and a carbon film precursor or conductive material are mixed with each other, the resultant mixture is vacuum-dried as necessary, and then the resultant dried mixture is baked under an inert condition or a reducing condition, preferably, at a temperature of 500° C. to 800° C. When the baking is carried out, it is possible to obtain a cathode material in which a surface except a bonding surface with the fibrous carbon in the surface of the $LiMPO_4$ particles, may be coated with carbon. In the baking, it is preferable to select conditions under which the element M is not oxidized.

As the carbon film precursor that may be used for the baking, aqueous organic materials of saccharides such as sucrose and lactose, ascorbic acid, 1,6-hexanediol, polyethylene glycol, polyethylene oxide, carboxymethyl cellulose are preferable.

(Cathode Material for Lithium Secondary Battery)

As shown in FIG. 1, the cathode material for a lithium secondary battery according to a preferred aspect of the embodiment is configured in such a manner that a plurality of cathode active material particles 2 composed of olivine-type $LiMPO_4$ (provided that, M represents one or more kinds of elements selected from Fe, Mn, Ni, and Co) are bonded to a surface of fibrous carbon 1. As shown in FIG. 1, the cathode active material particles 2 are attached to the surface of the fibrous carbon 1 in a granular shape not in a film shape.

In addition, in a case where the element M of $LiMPO_4$ includes two more kinds of elements selected from Fe, Mn, Ni, and Co, a molar ratio of the respective elements may be set within an arbitrary range. However, for example, in the case of including two kinds of elements of Mn and Fe, the molar ratio of the respective elements may be Mn:Fe=10:90 to 90:10, preferably Mn:Fe=50:50 to 90:10, and more preferably Mn:Fe=70:30 to 90:10. The composition of the element M may be adjusted by a mixing ratio of the M source. When the amount of Mn increases, energy density of a battery increases. When the amount of Fe increases, particularly, stability of a crystal at a high temperature increases. When the element M is composed of two more kinds of elements, the energy density of $LiMPO_4$ and the stability of a crystal may be compatible with each other.

In addition, it is preferable that one or more kinds of elements selected from Nb and V be contained in $LiMPO_4$. Since Nb or V is contained, a decrease in capacity may be suppressed when charging and discharging are repeated.

Figure 2:
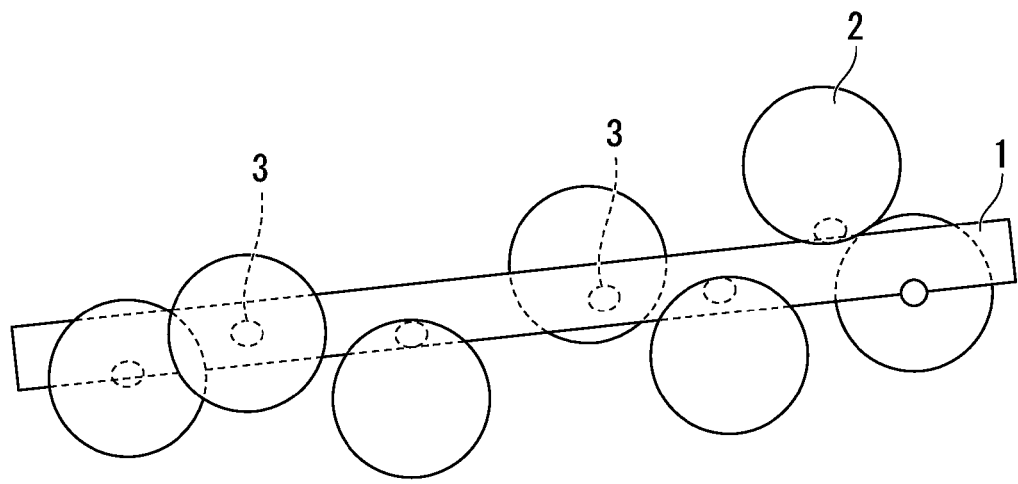
FIG. 2 is a schematic diagram illustrating another example of the cathode material as an embodiment of the invention.

In addition, in a case where metals or metal oxides 3 are carried on the surface of the fibrous carbon 1, as shown in FIG. 2, the cathode active material particles 2 are bonded to the surface at a position at which the metals or the metal oxides 3 are carried, thereby constituting the cathode material for a lithium secondary battery according to the embodiment.

Figure 3:
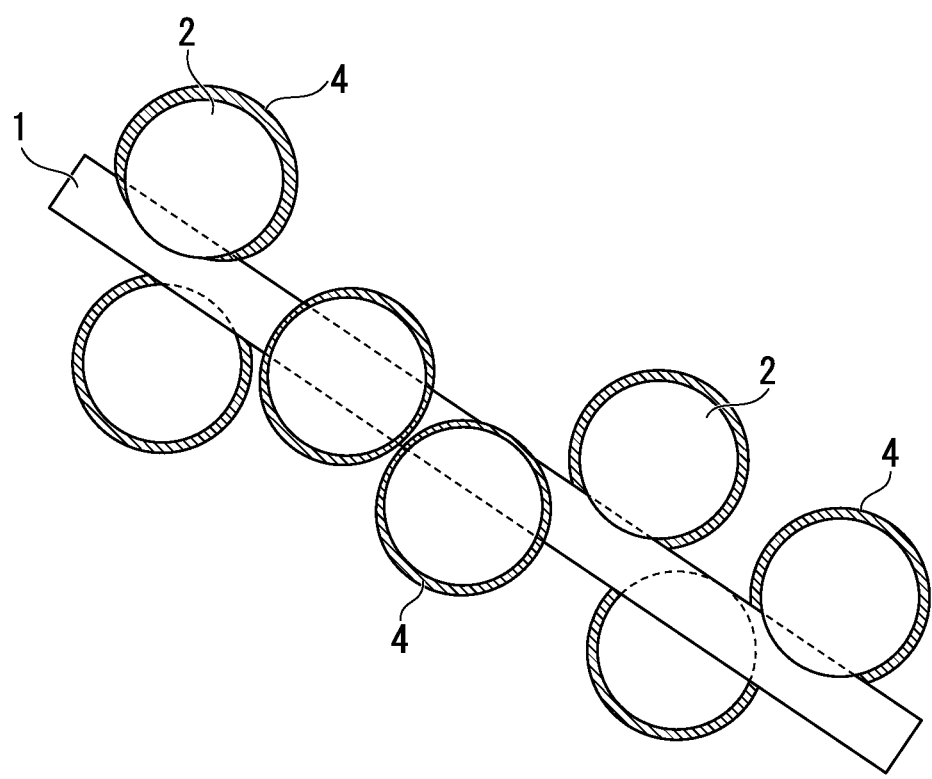
FIG. 3 is a schematic diagram illustrating still another example of the cathode material as an embodiment of the invention.

Furthermore, as shown in FIG. 3, in the surface of the cathode active material particles 2, a carbon film 4 may be formed on a surface except a bonding surface with the fibrous carbon 1.

Particularly, as shown in FIG. 3, the cathode active material particles 2 are directly bonded to the surface of the fibrous carbon 1, and the cathode active material particles are not bonded by a carbon layer which is not a structure of the fibrous carbon. However, as shown in FIG. 2, in a case where one or more kinds of metals selected from Co, Ti, V, Cr, Mn, W, Mo, Fe, Cu, Al, V, Nb, and Ta, or one or more kinds of the metal oxides 3 are carried on the surface of the fibrous carbon 1, the bonding surface may optionally contain the metals or the metal oxides 3.

In the cathode material according to a preferred aspect of the embodiment, since the cathode active material particles composed of $LiMPO_4$ having low electronic conductivity are bonded to the fibrous carbon having electronic conductivity, the electronic conductivity of the cathode active material particles may be compensated by the fibrous carbon. In addition, the carbon film is coated on the surface of the cathode active material particles, and thus the electronic conductivity of the cathode active material particles may be compensated. In addition, since the plurality of cathode active material particles composed of $LiMPO_4$ grow and are formed on the surface of the fibrous carbon, the fibrous carbon and the cathode active material particles are strongly bonded to each other, and thus separation and peeling does not occur against expansion and contraction of the cathode active material particles due to a temperature variation in an external environment or charging and discharging. Particularly, when metals or metal oxides are carried on the surface of the fibrous carbon, and the cathode active material particles grow using the metals or metal oxides as a growth origin and are bonded, the bonding is further strengthened.

The amount of the fibrous carbon in the cathode material is preferably in a range of 0.5% by mass to 10% by mass. When the amount of the fibrous carbon is 0.5% by mass or more, the fibrous carbon is not too less, and the electronic conductivity of the cathode material becomes sufficient. In addition, when the amount of the fibrous carbon is 10% by mass or less, the amount of the cathode active material particles does not relatively decrease, and thus the charging and discharging capacity of the cathode material may be maintained to be large. The amount of the fibrous carbon in the cathode material is more preferably in a range of 0.7% by mass to 6% by mass, and still more preferably in a range of 1.0% by mass to 4% by mass.

In addition, an average particle size of the cathode active material particles is preferably in a range of 20 nm to 200 nm, and more preferably in a range of 50 nm to 200 nm. When the average particle size is 20 nm or more, crystalline properties of $LiMPO_4$ does not decrease, and when the average particle size is 200 nm or less, Li ions are easily diffused to the inside of the cathode active material particles, and thus the charging and discharging capacity may be prevented from decreasing. In addition, with regard to a method of measuring the average particle size, the average particle size may be measured by a dynamic light scattering method.

The reason why the average fiber length and the aspect ratio of the fibrous carbon are limited is as described above.

(Lithium Secondary Battery)

The lithium secondary battery according to a preferred aspect of the embodiment includes a cathode, an anode, and a nonaqueous electrolyte. In the lithium secondary battery, as a cathode active material contained in the cathode, the cathode material produced according to the above-described method is used. When this cathode material is contained, a capacity retention rate after a charging and discharging cycle of the lithium secondary battery may be improved. Hereinafter, the cathode, the anode, and the nonaqueous electrolyte which constitute the lithium secondary battery will be sequentially described below.

(Cathode)

In the lithium secondary battery according to a preferred aspect of the embodiment, as the cathode, a sheet-like electrode, which includes a cathode mix containing a cathode material, a binding agent, and a conductive auxiliary material contained optionally as necessary, and a cathode current collector bonded to the cathode mix, may be used. In addition, as the cathode, a pellet-type or sheet-like cathode, which is formed by molding the cathode mix into a circular plate, may be used.

As a cathode material, a cathode material, which is produced according to the above-described method, is used. As described above, the cathode material is configured in such a manner that a plurality of cathode active material particles are bonded to the surface of the fibrous carbon.

Examples of the binding agent include polyethylene, polypropylene, ethylene propylene copolymers, ethylene propylene terpolymer, butadiene rubber, styrene butadiene rubber, butyl rubber, polytetrafluoroethylene, poly(meth) acrylate, polyvinylidene fluoride, polyethylene oxide, polypropylene oxide, polyepichlorohydrin, polyphosphazene, polyacrylonitrile, and the like.

When the electric conductivity of the cathode mix is sufficiently secured by the fibrous carbon constituting the cathode material, it not necessary for the conductive auxiliary material to be particularly added, but the conductive auxiliary material may be added to improve performance of the cathode. However, when the conductive auxiliary material is excessively added, a mixing ratio of the cathode material in the cathode mix relatively decreases, and thus the charging and discharging capacity decreases. Accordingly, whether or not to add the conductive auxiliary material may be determined based on the characteristics of the cathode.

Examples of the conductive auxiliary material include a conductive metal powder such as a silver powder; a conductive carbon powder such as furnace black, ketjen black, and acetylene black, and the like. In the case of adding the conductive auxiliary material, the added amount is preferably 0.1% by mass to 10% by mass on the basis of the dried weight of the cathode mix.

Furthermore, examples of the cathode current collector include foil of a conductive metal, a mesh of a conductive metal, a punched metal of the conductive metal, and the like. As the conductive metal, aluminum or an aluminum alloy is preferable.

Furthermore, the cathode mix may contain an ion conductive compound, a thickening agent, a dispersing agent, a lubricating agent, and the like. Examples of the ion conductive compound include polysaccharides such as chitin and chitosan, crosslinking substances of the polysaccharides, and the like. Examples of the thickening agent include carboxylmethyl cellulose, polyvinyl alcohol, and the like.

For example, the cathode may be obtained by applying a paste-like cathode mix to the cathode current collector, drying the cathode mix, and compression-molding the resultant cathode current collector, or compression-molding a powder grain-like cathode mix on the cathode current. The thickness of the cathode is commonly 0.04 mm to 0.15 mm. A cathode having an arbitrary electrode density may be obtained by adjusting the pressure that is applied during molding. The pressure applied during molding is preferably approximately 1 t/cm$^2$ to 3 t/cm$^2$.

(Anode)

As the anode, a sheet-like electrode, which includes an anode mix containing an anode active material, a binding agent, and a conductive auxiliary material contained optionally as necessary, and an anode current collector bonded to the anode mix, may be used. In addition, as the anode, a pellet-type or sheet-like anode, which is formed by molding the anode mix into a circular plate, may be used.

As the anode active material, an anode active material that is known in the related art may be used, and for example, a carbon material such as artificial graphite and natural graphite, a metal or metalloid material such as Sn and Si may be used.

As the binding agent, the same binding agent as that used in the cathode may be used.

Furthermore, the conductive auxiliary material may be added as necessary, or may not be added. For example, a conductive carbon powder such as furnace black, ketjen black, and acetylene black, carbon nanotube, carbon nanofiber, vapor phase method carbon fiber, and the like may be used. As the conductive additive, the vapor phase method carbon fiber is particularly preferable. A fiber length of the vapor phase method carbon fiber is preferably 5 nm to 0.2 µm. A ratio of fiber length/fiber diameter is preferably 5 to 1000. The amount of the vapor phase method carbon fiber is preferably 0.1% by mass to 10% by mass on the basis of the dried mass of the anode mix.

Furthermore, examples of the anode current collector include foil of a conductive metal, a net of the conductive metal, a punched metal of the conductive metal, and the like. As the conductive metal, copper or a copper alloy is preferable.

For example, the anode may be obtained by applying a paste-like anode mix to the anode current collector, drying the anode mix, and compression-molding the resultant anode current collector, or compression-molding a powder grain-like anode mix on the anode current collector. The thickness of the anode is commonly 0.04 mm to 0.15 mm. An anode having an arbitrary electrode density may be obtained by adjusting a pressure that is applied during molding. The pressure applied during molding is preferably approximately 1 t/cm$^2$ to 3 t/cm$^2$.

(Nonaqueous Electrolyte)

Next, as the nonaqueous electrolyte, for example, a nonaqueous electrolyte obtained by dissolving a lithium salt in an aprotic solvent is an exemplary example.

As the aprotic solvent, a mixed solvent of at least one or more kinds selected from a group consisting of ethylene carbonate, diethyl carbonate, dimethyl carbonate, methyl ethyl carbonate, propylene carbonate, butylene carbonate, and γ-butyrolactone, and vinylene carbonate is preferable.

In addition, examples of the lithium salt include $LiClO_4$, $LiPF_6$, $LiAsF_6$, $LiBF_4$, $LiSO_3CF_3$, $CH_3SO_3Li$, $CF_3SO_3Li$, and the like.

In addition, as the nonaqueous electrolyte, a so-called solid electrolyte or gel electrolyte may be used.

Examples of the solid electrolyte or gel electrolyte include a polymer electrolyte such as sulfonated styrene-olefin copolymer, a polymer electrolyte using polyethylene oxide and $MgClO_4$, a polymer electrolyte having trimethylene oxide structure, and the like. As the nonaqueous solvent used in a polymer electrolyte, at least one kind selected from a group consisting of ethylene carbonate, diethyl carbonate, dimethyl carbonate, methyl ethyl carbonate, propylene carbonate, butylene carbonate, and γ-butyrolactone, and vinylene carbonate is preferable.

Furthermore, the lithium secondary battery according to a preferred aspect of the embodiment may be provided with other members and the like as necessary without being limited to the cathode, the anode, and the nonaqueous electrolyte. For example, the lithium secondary battery may be provided with a separator that isolates the cathode and the anode from each other. The separator is a necessary component in a case where the nonaqueous electrolyte is not a polymer electrolyte. Examples of the separator include nonwoven fabric, woven fabric, a micro-porous film, a combination thereof, and the like. More specifically, a porous polypropylene film, a porous polyethylene film, and the like may be appropriately used.

The lithium secondary battery according to a preferred aspect of the embodiment may be used in various fields. For example, electric and electronic apparatuses such as a personal computer, a tablet computer, a note-type computer, a cellular phone, a wireless radio, an electronic organizer, an electronic dictionary, a PDA (Personal Digital Assistant), an electronic meter, an electronic key, an electronic tag, an energy storage device, a power tool, a toy, a digital camera, a digital video, AV equipment, and a vacuum cleaner; transportation systems such as an electric vehicle, a hybrid vehicle, an electric bike, a hybrid bike, an electric bicycle, an electric-assisted bicycle, a railway engine, an aircraft, and a vessel; power generation systems such as a solar power generation system, a wind power generation system, a tidal power generation system, a geothermal power generation system, a thermal difference power generation system, and a vibration power generation system; and the like.

EXAMPLES

Example 1

1. Synthesis Process

In a glove box of a nitrogen atmosphere in which an oxygen concentration was controlled to 0.5% or less, 123 g of LiOH.H$_2$O was dissolved in 700 mL of water, and 3.1 g of a carbon fiber (VGCF-H, manufactured by SHOWA DENKO K.K (VGCF is a registered trade mark. The same shall apply hereinafter)) was added to the resultant mixture, and the resultant mixture was stirred. The average fiber length of the carbon fiber was 15 μm, the fiber diameter was 150 nm, and an aspect ratio was 100. Furthermore, 113 g of phosphoric acid having a concentration of 85% was gradually added to the mixture while being stirred. In this manner, a first raw material liquid was prepared.

Next, in the glove box, 1.82 g of ascorbic acid was dissolved in 700 mL of water, and 272 g of FeSO$_4$.7H$_2$O was dissolved in the resultant mixture to prepare a second raw material liquid.

Continuously, in the glove box, the first and second raw material liquids were mixed and stirred, and then the resultant mixture was put into the autoclave and was hermetically closed. Then, a temperature of the autoclave was raised from room temperature to 120° C. for 1 hour, retention was carried out at 120° C. for 3 hours, and the temperature was raised to 200° C. for 1 hour, and retention was carried out at 200° C. for 3 hours to allow LiFePO$_4$ particles having an average particle size of 100 nm to grow on the surface of the carbon fiber, whereby a cathode material was produced. Then, natural cooling to room temperature was carried out. In addition, with regard to a method of measuring the average particle size, the average particle size was measured by a dynamic light scattering method.

After the autoclave was cooled to room temperature, a suspension containing the cathode material was taken out, and was filtered and washed with water. The washed cathode material was heated in a vacuum to 100° C., and then was dried for 5 hours.

2. Carbon Coating Process

Next, a sucrose solution obtained by dissolving 25 g of sucrose in 100 g of water was prepared, and 50 g of the sucrose solution was added to 102 g of the dried cathode material, and the resultant mixture was stirred. This mixture was heated in vacuum at 100° C. for 5 hours to dry the mixture. A temperature of the dried cathode material was raised from room temperature to 700° C. for 90 minutes in nitrogen, and was heated at that temperature for 3 hours, and then natural cooling was carried out, whereby carbon was coated on the surface of the LiFePO$_4$ particles. Then, the cathode material coated with carbon was pulverized using A10 pulverizer manufactured by IKA Corporation. In this manner, the cathode material of Example 1 was prepared. In the cathode material of Example 1, the amount of the carbon fiber was 2% by mass, the amount of the coating carbon was 2% by mass, and the amount of the LiFePO$_4$ particles was 96% by mass.

3. Production of Battery 5 g of acetylene black manufactured by DENKI KAGAKU KOGYO KABUSHIKI KAISHA as a conductive additive, 5 g of PVDF (polyvinylidene fluoride) manufactured by KUREHA CORPORATION as a binding agent, and 300 g of NMP (N-methyl-2-pyrolidone) as a solvent were added to 90 g of the cathode material of Example 1, and then the resultant mixture was agitated to be uniform. The mixture after agitation was applied onto Al foil at a thickness of 30 μm, and then was dried at 90° C. The dried mixture was pressed in order for the cathode mix to have a density of 2.2 g/cm$^3$, thereby obtaining a cathode.

Next, 5 g of acetylene black manufactured by DENKI KAGAKU KOGYO KABUSHIKI KAISHA as a conductive additive, 5 g of PVDF manufactured by KUREHA CORPORATION as a binding agent, and 50 g of NMP as a solvent were added to 95 g of mesocarbon microbead graphite manufactured by OSAKA GAS Co., LTD as an anode active material, and the resultant mixture was agitated to be uniform. The mixture after agitation was applied onto Cu foil at a thickness of 35 μm, and then was dried at 90° C. The dried mixture was pressed in order for the anode mix to have a density of 1.5 g/cm$^3$, thereby obtaining an anode.

A micro-porous film formed from polypropylene (cell guard 2400) as a separator, and the anode were overlapped on the cathode, and a liquid, which was obtained by dissolving 1.0 mole/L of LiPF$_6$ in a mixed liquid of EC (ethylene carbonate) and EMC (ethyl methyl carbonate) with a volume ratio of 2:3, was put in as an electrolytic solution, whereby a coin-type battery having a height of 2.4 mm and a diameter of 23 mm of Example 1 was produced.

4. Charging and Discharging Cycle Test

With respect to the coin-type battery of Example 1, a cycle, in which constant current and constant voltage charging was carried out to 3.9 V with a current of 0.2 C at a temperature of 25° C., and then constant current discharging to 2.3 V was carried out, was repeated 500 times. The discharging capacity at the 3$^{rd}$ cycle was 153 mAh/g, and a discharging capacity at the 500$^{th}$ cycle was 143 mAh/g. The discharging capacity retention rate (500$^{th}$ discharging capacity/3$^{rd}$ discharging capacity) was 93.5%. In addition, the discharging capacity represents a capacity per mass of the cathode active material (LiFePO$_4$), and the same shall apply hereinafter.

5. Temperature Cycle Test

With respect to the coin-type battery of Example 1, a cycle in which constant current and constant voltage charging was carried out to 3.9 V with a current of 0.2 C, and then constant current discharging to 2.3 V was carried out, was repeated twice. A discharging capacity at the 2$^{nd}$ cycle was 153 mAh/g. Next, a temperature cycle, in which retention was carried out at −10° C. for 60 minutes, the temperature was raised to 60° C. for 60 minutes, retention was carried out at 60° C. for 60 minutes, and the temperature was lowered to −10° C. for 60 minutes, was repeated 60 times. Then, a cycle, in which constant current and constant voltage charging was carried out to 3.9 V with a current of 0.2 C, and then constant current discharging to 2.3 V was carried out, was repeated twice. The discharging capacity at the 2$^{nd}$ cycle was 118 mAh/g. The discharging capacity retention rate (discharging capacity at the 2$^{nd}$ cycle after carrying out the temperature cycle/discharging capacity at the 2$^{nd}$ cycle before carrying out the temperature cycle) was 77.1%.

Example 2

A cathode material of Example 2 and a coin-type battery of Example 2 were produced in the same manner as Example 1 except that a carbon fiber (VGCF-H, manufactured by SHOWA DENKO K.K) in which Fe was used as a catalyst and a remaining ratio of Fe was 0.1% was produced instead of the carbon fiber of Example 1, and the first raw material liquid was prepared using the carbon fiber. In the cathode material of Example 2, the amount of the carbon fiber was 2% by mass, the amount of the coating carbon was 2% by mass, and the amount of the $LiFePO_4$ particles was 96% by mass.

The charging and discharging cycle test was carried out under the same conditions as Example 1. A discharging capacity at the $2^{nd}$ cycle was 151 mAh/g, a discharging capacity at the $500^{th}$ cycle was 140 mAh/g, and a discharging capacity retention rate from the $2^{nd}$ cycle to the $500^{th}$ cycle was 92.7%.

In addition, the temperature cycle test was carried out under the same conditions as Example 1. A discharging capacity at the $2^{nd}$ cycle before carrying out the temperature cycle was 154 mAh/g, a discharging capacity at the $2^{nd}$ cycle after carrying out the temperature cycle was 120 mAh/g, and a discharging capacity retention rate was 77.9%.

Example 3

A cathode material of Example 3 and a coin-type battery of Example 3 were produced in the same manner as Example 1 except that in the glove box of a nitrogen atmosphere in which an oxygen concentration was controlled to 0.5% or less, 113 g of $Li_3PO_4$ was dissolved in 700 mL of water, 3.1 g of the same carbon fiber (VGCF-H, manufactured by SHOWA DENKO K.K) as Example 1 was added to the resultant mixture, and the resultant mixture was stirred to prepare the first raw material liquid. In the cathode material of Example 3, the amount of the carbon fiber was 2% by mass, and the amount of the $LiFePO_4$ particles was 96% by mass.

In addition, the charging and discharging cycle test was carried out under the same conditions as Example 1. A discharging capacity at the $2^{nd}$ cycle was 153 mAh/g, a discharging capacity at the $500^{th}$ cycle was 141 mAh/g, and a discharging capacity retention rate from the $2^{nd}$ cycle to the $500^{th}$ cycle was 92.2%.

In addition, the temperature cycle test was carried out under the same conditions as Example 1. A discharging capacity at the $2^{nd}$ cycle before carrying out the temperature cycle was 152 mAh/g, a discharging capacity at the $2^{nd}$ cycle after carrying out the temperature cycle was 122 mAh/g, and a discharging capacity retention rate was 80.3%.

Example 4

A cathode material of Example 4 and a coin-type battery of Example 4 were produced in the same manner Example 1 except that carbon coating was not carried out with respect to $LiFePO_4$ particles. In the cathode material of Example 4, the amount of the carbon fiber was 2% by mass, and the amount of the $LiFePO_4$ particles was 98% by mass.

With respect to the coin-type battery of Example 4, the charging and discharging cycle test was carried out under the same conditions as Example 1. A discharging capacity at the $2^{nd}$ cycle was 150 mAh/g, a discharging capacity at the $500^{th}$ cycle was 140 mAh/g, and a discharging capacity retention rate from the $2^{nd}$ cycle to the $500^{th}$ cycle was 93.3%.

In addition, the temperature cycle test was carried out under the same conditions as Example 1. The discharging capacity at the $2^{nd}$ cycle before carrying out the temperature cycle was 150 mAh/g, the discharging capacity at the $2^{nd}$ cycle after carrying out the temperature cycle was 118 mAh/g, and the discharging capacity retention rate was 78.7%.

Example 5

A cathode material of Example 5 and a coin-type battery of Example 5 were produced in the same manner as Example 1 except that the first raw material liquid was prepared using 165 g of $MnSO_4.5H_2O$ and 82 g of $FeSO_4.7H_2O$. The cathode material of Example 5 was a cathode material in which $LiFe_{0.3}Mn_{0.7}PO_4$ particles having an average particle size of 100 nm were allowed to grow on the surface of the carbon fiber, and $LiFe_{0.3}Mn_{0.7}PO_4$ particles were coated with carbon. In the cathode material of Example 5, the amount of the carbon fiber was 2% by mass, the amount of the coating carbon was 2% by mass, and the amount of the $LiFe_{0.3}Mn_{0.7}PO_4$ particles was 96% by mass.

With respect to the coin-type battery of Example 5, the charging and discharging cycle test was carried out under the same conditions as Example 1. The discharging capacity at the $2^{nd}$ cycle was 153 mAh/g, the discharging capacity at the $500^{th}$ cycle was 143 mAh/g, and the discharging capacity retention rate from the $2^{nd}$ cycle to the $500^{th}$ cycle was 93.5%.

In addition, the temperature cycle test was carried out under the same conditions as Example 1. The discharging capacity at the $2^{nd}$ cycle before carrying out the temperature cycle was 152 mAh/g, the discharging capacity at the $2^{nd}$ cycle after carrying out the temperature cycle was 119 mAh/g, and the discharging capacity retention rate was 78.3%.

Example 6

A cathode material of Example 6 and a coin-type battery of Example 6 were produced in the same manner as Example 1 except that the first raw material liquid was prepared using VGCF-X (an average fiber length was 3 μm, and an aspect ratio was 250) manufactured by SHOWA DENKO K.K instead of the carbon fiber of Example 1. The cathode material of Example 6 was a cathode material in which $LiFePO_4$ particles having an average particle size of 100 nm were allowed to grow on the surface of the carbon fiber, and $LiFePO_4$ particles were coated with carbon. In the cathode material of Example 6, the amount of the carbon fiber was 2% by mass, the amount of the coating carbon was 2% by mass, and the amount of the $LiFePO_4$ particles was 96% by mass.

With respect to the coin-type battery of Example 6, the charging and discharging cycle test was carried out under the same conditions as Example 1. The discharging capacity at the $2^{nd}$ cycle was 152 mAh/g, the discharging capacity at the $500^{th}$ cycle was 144 mAh/g, and the discharging capacity retention rate from the $2^{nd}$ cycle to the $500^{th}$ cycle was 94.7%.

In addition, the temperature cycle test was carried out under the same conditions as Example 1. The discharging capacity at the $2^{nd}$ cycle before carrying out the temperature cycle was 154 mAh/g, the discharging capacity at the $2^{nd}$ cycle after carrying out the temperature cycle was 120 mAh/g, and the discharging capacity retention rate was 77.9%.

Comparative Example 1

1. Preparation of Cathode Material

The first raw material liquid was prepared in the same manner as Example 1 except that the carbon fiber was not mixed, and the cathode material was produced in the same manner as Example 1 except that this first raw material liquid was used. The cathode material was LiFePO$_4$ particles having an average particle size of 100 nm.

Next, a sucrose solution obtained by dissolving 25 g of sucrose in 100 g of water was prepared, and 50 g of the sucrose solution was added to 102 g of the dried cathode material, and the resultant mixture was stirred. This mixture was heated in vacuum at 100° C. for 5 hours to dry the mixture. A temperature of the dried cathode material was raised from room temperature to 700° C. for 90 minutes in nitrogen, and was heated at that temperature for 3 hours, and then natural cooling was carried out, whereby carbon was coated on the surface of the LiFePO$_4$ particles. Then, the cathode material coated with carbon was pulverized using A10 pulverizer manufactured by IKA Corporation. In this manner, the cathode material of Comparative Example 1 was prepared.

2. Preparation of Battery 1.8 g of a carbon fiber (VGCF-H, manufactured by SHOWA DENKO K.K) having an average fiber length of 15 μm and an aspect ratio of 100, 5 g of acetylene black manufactured by DENKI KAGAKU KOGYO KABUSHIKI KAISHA as a conductive additive, 5 g of PVDF (polyvinylidene fluoride) manufactured by KUREHA CORPORATION as a binding agent, and 300 g of NMP (N-methyl-2-pyrolidone) as a solvent were added to 88.2 g of the cathode material of Comparative Example 1, and then the resultant mixture was agitated to be uniform. The mixture after agitation was applied onto Al foil at a thickness of 30 μm, and then was dried at 90° C. The dried mixture was pressed in order for the cathode mix to have a density of 2.2 g/cm$^3$, thereby obtaining a cathode.

Next, an anode was produced in the same manner as Example 1.

A micro-porous film formed from polypropylene (cell guard 2400) as a separator, and the anode were overlapped on the cathode, and a liquid, which was obtained by dissolving 1.0 mole/L of LiPF$_6$ in a mixed liquid of EC (ethylene carbonate) and EMC (ethyl methyl carbonate) with a volume ratio of 2:3, was put in as an electrolytic solution, whereby a coin-type battery having a height of 2.4 mm and a diameter of 23 mm of Comparative Example 1 was produced.

3. Cycle Test

In addition, the charging and discharging cycle test was carried out under the same conditions as Example 1. The discharging capacity at the $2^{nd}$ cycle was 152 mAh/g, the discharging capacity at the $500^{th}$ cycle was 129 mAh/g, and the discharging capacity retention rate from the $2^{nd}$ cycle to the $500^{th}$ cycle was 84.9%.

In addition, the temperature cycle test was carried out under the same conditions as Example 1. The discharging capacity at the $2^{nd}$ cycle before carrying out the temperature cycle was 153 mAh/g, the discharging capacity at the $2^{nd}$ cycle after carrying out the temperature cycle was 103 mAh/g, and the discharging capacity retention rate was 67.3%.

Comparative Example 2

LiFePO$_4$ particles having an average particle size of 100 nm were produced by carrying out synthesis in the same manner as Comparative Example 1, and the LiFePO$_4$ particles were coated with carbon to prepare a cathode material.

Next, 88.2 g of cathode material after being coated with carbon, and 1.8 g of a carbon fiber (VGCF-H, manufactured by SHOWA DENKO K.K) having an average fiber length of 15 μm and an aspect ratio of 100 were put into a mechano-fusion system manufactured by Hosokawa Micron Group to allow both of these to be mechano-chemically coupled. In this manner, a cathode material of Comparative Example 2 was prepared. Furthermore, a coin-type battery of Comparative Example 2 was produced in the same manner as Example 1 except that the cathode material of Comparative Example 2 was used.

With respect to the coin-type battery of Comparative Example 2, the charging and discharging cycle test was carried out under the same conditions as Example 1. A discharging capacity at the $2^{nd}$ cycle was 153 mAh/g, a discharging capacity at the $500^{th}$ cycle was 136 mAh/g, and a discharging capacity retention rate from the $2^{nd}$ cycle to the $500^{th}$ cycle was 88.9%.

In addition, the temperature cycle test was carried out under the same conditions as Example 1. The discharging capacity at the $2^{nd}$ cycle before carrying out the temperature cycle was 152 mAh/g, the discharging capacity at the $2^{nd}$ cycle after carrying out the temperature cycle was 109 mAh/g, and the discharging capacity retention rate was 71.7%.

As described above, it can be understood that in Examples 1 to 6, the discharging capacity retention rate after the temperature cycle becomes higher compared to Comparative Examples 1 to 2. This is assumed because in Comparative Examples 1 and 2, the cathode active material and the carbon fiber are peeled from each other due to the temperature cycle test.

REFERENCE SIGNS LIST

1. Fibrous carbon
2. Cathode active material particle
3. Metal or metal oxide
4. Carbon film

The invention claimed is:

1. A cathode material for a lithium secondary battery, comprising:
    a fibrous carbon; and
    a plurality of cathode active material particles composed of olivine-type LiMPO$_4$, wherein M represents one or more kinds of elements selected from Fe, Mn, Ni, and Co,
    wherein the cathode active material particles are directly bonded to the surface of the fibrous carbon, and
    the cathode active material particles are not bonded by a carbon layer which is not a structure of the fibrous carbon,
    wherein a surface except a bonding surface with the fibrous carbon in a surface of the cathode active material particles, is coated with carbon.

2. The cathode material for a lithium secondary battery according to claim 1,
    wherein one or more kinds of metals selected from Co, Ti, V, Cr, Mn, W, Mo, Fe, Cu, Al, V, Nb, and Ta, or one or more kinds of oxides of the metals are carried on the surface of the fibrous carbon, and the cathode active material particles are bonded to the surface at a position at which the metals or metal oxides are carried.

3. The cathode material for a lithium secondary battery according to claim 1, wherein the amount of the fibrous carbon is in a range of 0.5% by mass to 10% by mass in the cathode material.

4. The cathode material for a lithium secondary battery according to claim 1,
wherein an average fiber length of the fibrous carbon is in a range of 1 μm to 100 μm.

5. The cathode material for a lithium secondary battery according to claim 4,
wherein an aspect ratio (fiber length/fiber diameter), which is a ratio of a fiber length to a fiber diameter of the fibrous carbon, is in a range of 5 to 1000.

6. The cathode material for a lithium secondary battery according to claim 1,
wherein an average particle size of the cathode active material particles is in a range of 20 nm to 200 nm.

7. The cathode material for a lithium secondary battery according to claim 1,
wherein one or two kinds of elements selected from Nb and V are contained in $LiMPO_4$.

8. A method of producing the cathode material for a lithium secondary battery according to claim 1, the method comprising:
carrying out a conversion reaction into olivine-type $LiMPO_4$ at 100° C. or higher by using a Li source, an M source, and a phosphoric acid source as a raw material under the presence of a polar solvent in which fibrous carbon is mixed to allow a plurality of cathode active material particles composed of the $LiMPO_4$ to grow on a surface of the fibrous carbon.

9. The method of producing a cathode material for a lithium secondary battery according to claim 8, further comprising:
preparing a first raw material liquid comprising any one kind of source selected from the lithium source, the M source, and the phosphoric acid source, and the polar solvent, and a second raw material liquid comprising the remainder which is not contained in the first raw material liquid among the lithium source, the M source, and the phosphoric acid source, and the polar solvent;
adding the fibrous carbon to one or both of the first raw material liquid and the second raw material liquid in advance, or adding the fibrous carbon when the first raw material liquid and the second raw material liquid are mixed; and
mixing the first raw material liquid and the second raw material liquid to allow the conversion reaction to occur.

10. The method of producing a cathode material for a lithium secondary battery according to claim 8,
wherein the conversion reaction is carried out under conditions of retention at a temperature of 100° C. to 160° C. and a pressure of 0.1 MPa to 0.6 MPa for 30 minutes to 30 hours, and then retention at a temperature of 180° C. to 260° C. and a pressure of 1.0 MPa to 4.7 MPa for 30 minutes to 30 hours.

11. The method of producing a cathode material for a lithium secondary battery according to claim 8,
wherein as the fibrous carbon, fibrous carbon in which one or more kinds of metals selected from Co, Ti, V, Cr, Mn, W, Mo, Fe, Cu, Al, V, Nb, and Ta, or one or more kinds of oxides of the metals are carried on the surface is used.

12. The method of producing a cathode material for a lithium secondary battery according to claim 8,
a material comprising Nb or V is added to the raw material.

13. The method of producing a cathode material for a lithium secondary battery according to claim 8,
wherein the lithium source is lithium hydroxide, the M source is a sulfate of one or more kinds of metals selected from Fe, Mn, Ni, and Co, and the phosphoric acid source is phosphoric acid.

14. The method of producing a cathode material for a lithium secondary battery according to claim 8,
wherein lithium phosphate is used as the lithium source and the phosphoric acid source.

\* \* \* \* \*